W. VON HOFE.
Glass-Cutting Machines.

No. 134,498. Patented Dec. 31, 1872.

UNITED STATES PATENT OFFICE.

WILLIAM VOM HOFE, OF NEW YORK, N. Y.

IMPROVEMENT IN GLASS-CUTTING MACHINES.

Specification forming part of Letters Patent No. 134,498, dated December 31, 1872.

*To all whom it may concern:*

Be it known that I, WILLIAM VOM HOFE, of the city, county, and State of New York, have invented a new and Improved Machine for Cutting Glass; and I do hereby declare the following to be a full, clear, and exact description thereof, which will enable those skilled in the art to make and use the same, reference being had to the accompanying drawing forming part of this specification, in which drawing—

Figure 1:
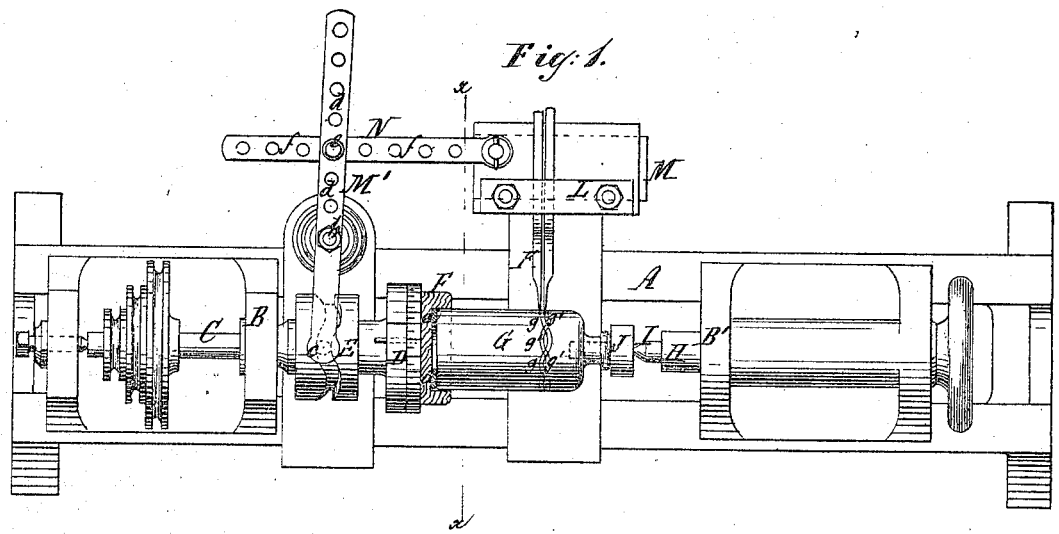
Figure 2:
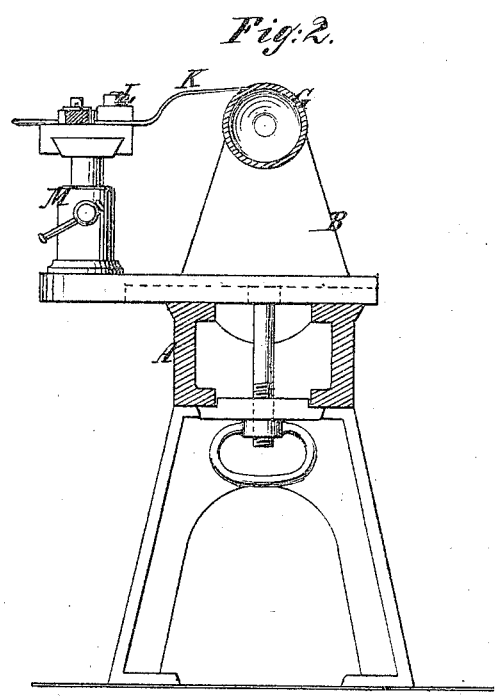

Figure 1 represents a plan or top view of my invention, and Fig. 2 is a transverse section of the same in the plane *x x*, Fig. 1.

Similar letters indicate corresponding parts.

This invention relates to machines for cutting glass; and it consists in arranging the cutting tool or tools in a clamp-slide, which carries the tool or tools in a direction parallel to the axis of revolution of the article to be operated upon, the requisite and desired movement being imparted to the slide and cutting tools by a rod connected with a lever which is controlled in its motion by a pattern-wheel arranged upon the lathe-spindle. The slide and lathe-spindle are arranged in respect to each other so as to receive, retain, and revolve the article to be cut. With the pattern-wheel, the lathe-spindle, and the tracing-tool is combined a double face-plate provided with an index, so that it can be turned for any desired fractional part of its circumference, and thereby the designs to be produced by the tracing tool or tools can be varied in different ways. On the bottom surface of the chuck is secured a ring or pad of India rubber, which effectually prevents the work from slipping in the chuck when the tracing-tool takes effect.

In the drawing, the letter A designates the frame of a turning-lathe, which forms the support for the two heads B B'. The head B forms the bearings for the spindle C, which receives a revolving motion by means of a belt, and on which are mounted the face-plate D and the pattern-wheel E. The face-plate is made of two sections, which are provided on their peripheries with suitable marks or lines dividing the same off into a number of equal parts, and which are connected together, so that the outer section can be turned round on the inner section, and then adjusted in the desired position by means of a set-screw or otherwise. On the outer section of the face-plate is secured the chuck F intended to receive the article G, of glass or other vitreous material, which is to be subjected to the action of the tracing-tool, said article being pressed against the bottom surface of the chuck by the action of the slide H, which is fitted into the head B' of the lathe, and which carries the center I. Between this center and the end of the article G is placed a piece, J, of wood or other suitable material, which revolves with said article on the center. In the bottom of the chuck F is secured a ring or pad, *a*, of India rubber, felt, or other suitable material, which prevents the work from slipping and compels the same to turn with the lathe-spindle.

The tracing or cutting tool K, which I use in my machine, is made of a strip of sheet metal—sheet-steel being used by preference—provided with a cutting-point, which may be made solid with the spring-shank, or which may be secured to the same in any desirable manner; and this tool is secured in a clamp, L, which is fitted on the rest M of the lathe, so that it can be made to slide thereon. If the tool-clamp L is held stationary and the point of the tool is brought to bear upon the surface of the work while emery or other similar material is fed thereon, a plain circular line is produced on the work; and I am enabled to manufacture, among other things, measuring-glasses for druggists which are provided with scales, the lines of which extend clear round, so that such measures, when being used, can be readily held in a level position and the correct measure is obtained. The tool, being depressed on the surface of the work by the elasticity of its shank, is enabled to accommodate itself to said surface.

If I desire to produce ornamental lines on the surface of the work, I connect the tool-clamp L with the pattern-wheel, the connection being effected by means of a lever, M', and rod N. This lever has its fulcrum on a pivot, *b*, secured in a standard, which rises from the frame A, and which may be made adjustable thereon. On one end of said lever is mounted a roller-stud, *c*, which engages with the pattern-wheel E, while the other end of said lever is provided with a series of holes, *d*, to receive a pin, *e*, that forms the connection between said lever and the rod N. This rod is also provided with a series of holes, $f$, and by changing the position of the pin $e$ in the holes $d$ and $f$ the stroke of the tool-clamp can be increased or diminished. If the tool-clamp is connected to the pattern-wheel the lines produced on the work correspond to the contours of the pattern-wheel. If the pattern-wheel is of such a shape that the tool traces a wave-line, $g$, composed of, say, eight segments, and I turn the outer section of the face-plate for one-eighth of the circle, a second line, $g'$, is traced, which intersects the line $g$. By thus combining the sectional face-plate with the pattern-wheel and the sliding tool-clamp various ornamental lines can be produced on the surface of the work.

In the drawing I have shown two tracing-tools placed side by side, and by their action lines are produced, as shown. If desired, one or more tracing-tools can be used, and a number of ornamental lines can be produced at the same time.

By this machine much time and labor are saved, and ornaments can be produced which it would be exceedingly difficult, if not impossible, to produce by hand.

What I claim as new, and desire to secure by Letters Patent, is—

1. In combination with the cutting-tool arranged in a sliding clamp carrying the cutting-tool in a direction parallel to the axis of revolution of the article to be traced, the lever M', rod N, pattern-wheel E, lathe-spindle C, and slide H, substantially as described.

2. The slide H and spindle C arranged in respect to each other so as to receive, retain, and revolve the article, G, to be cut, in combination with one or more cutting-tools, K K, rod N, lever M', and pattern-wheel E, the whole constructed and arranged substantially as shown and set forth.

3. The combination of a sectional face-plate having a scale on its circumference with a pattern-wheel, a lathe-spindle, and with a tool-clamp having a sliding motion on its rest or support, substantially as set forth.

4. The arrangement of a pad or ring of India rubber in the bottom of the chuck F, to prevent the work from slipping, substantially as set forth.

Witnesses:   WILLIAM VOM HOFE.
  W. HAUFF,
  E. F. KASTENHUBER.